A. F. KIPPER.
WIND DEFLECTOR AND REAR SIGHT MIRROR.
APPLICATION FILED APR. 7, 1920.

1,435,310.

Patented Nov. 14, 1922.

INVENTOR.
BY
ATTORNEY.

Patented Nov. 14, 1922.

1,435,310

UNITED STATES PATENT OFFICE.

ALLEN F. KIPPER, OF GLENDALE, CALIFORNIA.

WIND DEFLECTOR AND REAR-SIGHT MIRROR.

Application filed April 7, 1920. Serial No. 373,020.

*To all whom it may concern:*

Be it known that I, ALLEN F. KIPPER, a citizen of the United States, residing in the city of Glendale, county of Los Angeles, and State of California, have invented certain new and useful Improvements in Wind Deflectors and Rear-Sight Mirrors, of which the following is a specification.

My invention relates to a combination wind deflector and rear sight mirror, which can be manufactured as a complete article and readily attached to the side of the usual wind shield of an automobile for the purpose of deflecting the wind and also giving through the mirror a clear sight rearwardly along the side of the vehicle. I am aware that wind shields or deflectors have been used and also that rear sight mirrors have been used, but both are usually attached to the same part of the wind shield and when one is used, the other cannot be used for the reason that the one interferes with the other. I have provided a combination article, which is self contained, and which can be attached to the support by a single attaching means and which permits of the ready adjustment of the wind deflector and also of the adjustment of the rear sight mirror, each being independently adjustable and both being adjustable relative to each other, thus providing a single article of manufacture serving both purposes. In order to accomplish this, I have shown in the accompanying drawings one practical embodiment of my invention, in which the glass wind deflector and the rear sight mirror are so adjustably supported relative to each other that the mirror is viewed through the glass deflector, the mirror being mounted in front of the glass deflector and adjacent thereto so that the driver being shielded by the deflector can look through said deflector and into the mirror for a view to the rear along side his car.

Referring now more in detail to the drawings, 1 designates a glass wind deflector, supported by a bracket, 2, to the side frame, 3, of a wind shield of an automobile, said wind deflector being adjustably supported, as clearly shown, so that it can be turned to various positions, as may be desired. The attachment to the glass deflector, as at 4, 4, is sufficiently inwardly from the inner edge thereof, so that when said deflector is turned about the pivot connection at 5, the inner edge of said deflector turns rearwardly, or towards the driver, while the outer edge of the deflector turns forwardly, thus making it possible to adjust the deflector so as to direct the wind inwardly to the persons occupying the front seat, as will be readily understood from the showing. The wind deflector is locked in its different positions of adjustment by the hand bolt 6, which tightens the clamping members on the pivot pin at 5, and also on the pivot rod, 7, which constitutes the pivotal connection to the glass deflector 1, as will be clear from the drawings. The bracket is attached directly to the glass by means of large washer-like members 4, 4, with a screw through the glass, as shown.

Figure 2:
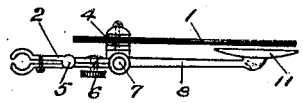
Figure 2 is a top plan view thereof.
Figure 1:
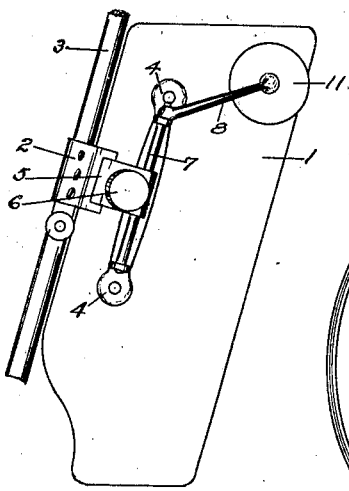
Figure 1 is a view showing a wind deflector and rear sight mirror embodying my invention.
Figure 3:
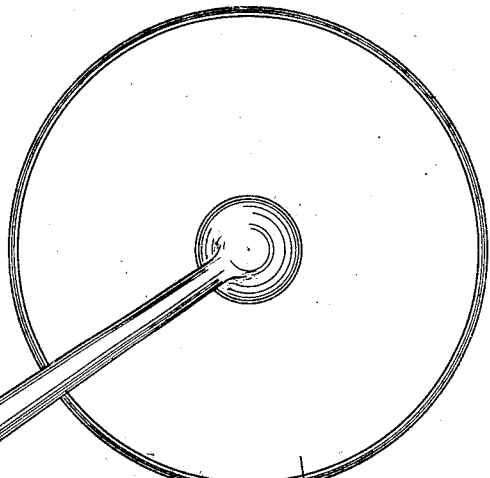
Figure 3 is an enlarged view showing the rear sight mirror and its supporting arm attached to the frame of the wind deflector, shown in fragmentary view.
Figure 4:
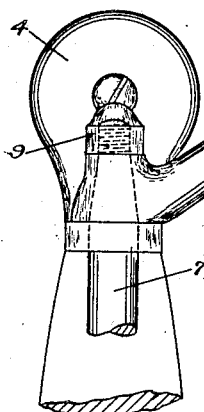
Figure 4 is a fragmentary view, partly in section, showing in detail the adjustable attaching means for the mirror at the outer end of the arm.

I will now describe my rear sight mirror which is made as a part of the wind deflector. An arm, 8, is pivotally connected to the upper end of the pivot rod 7, as clearly indicated, with a holding nut 9, whereby said arm can be swung about a vertical axis independently of the adjustments of the deflector itself. The outer end of said arm 8 is provided with a mirror, 10, held in a sheet metal back, 11, preferably stamped out of sheet material and provided with a centrally positioned globular-like extension, 12, with an opening, 13, therethrough, said globular-like extension, 12, fitting into a corresponding cavity, 14, formed in the end of the arm 8, as clearly indicated in Fig. 4, and being adapted to turn therein. A screw bolt 15, provided with a nut, 16, positioned in said globular extension 12, as indicated, is screwed into the end of the arm 8, as indicated. The nut 16 turns on the bolt 15, and turns with the mirror back 11, the bolt remaining stationary in the end of the arm 8. Thus when the mirror back and mirror are turned in one direction, said nut is moved outwardly on the bolt and the back 11 and the mirror can be turned universally, and then when turned in the other direction, said nut is turned on the bolt so as to tighten the globular extension 12 in the cavity 14, and thus lock the mirror in the adjusted position. This is easily accomplished by simply grasping the mirror and its back around the outer periphery thereof and turning in slightly to loosen the nut, then adjust it to the desired angle, and turning it back to tighten the nut and again lock the parts together to the end of the arm 8. Thus the mirror can be adjusted universally relative to the outer end of the arm 8. Said arm can be swung on the upper end of the pivot rod 7, to adjust the mirror as to distance from the glass deflector, and no matter what may be the desired adjustment of the glass deflector, the mirror can be positioned so that the driver can look through the glass deflector into the mirror to get a view rearwardly along the side of the car.

I am aware that changes in details can be made without departing from the spirit of my invention, and I do not, therefore, limit the invention to the showing made, except as I may be limited by the hereto appended claims.

I claim:

1. In a device of the character referred to, a supporting member and an adjustable member interfitting one within the other by means of a concaved surface on one member to receive a convexed surface on the other member, whereby one member can be turned in all directions relative to the other, a connecting screw through said members, and a locking nut in one of said members and adapted to tighten the interfitting members together when said nut is turned in one direction and to loosen said members for adjustment when said nut is turned in the opposite direction, said nut being adapted to be turned by turning one of said members relative to the other.

2. In a device of the character referred to, a supporting arm provided with a concaved part, a member having a globular-like extension seated in said concaved part, a holding nut seated in said globular-like extension to turn therewith, a bolt through said nut, having threaded engagement therewith and with said arm, whereby when said member with its globular extension is turned in one direction it is tightened in said concaved part and when turned in the opposite direction it is loosened for adjustment universally, substantially as described.

Signed at Los Angeles, Los Angeles County, California, this 27th day of March, 1920.

ALLEN F. KIPPER.

Witnesses:
D. O. FAWCETT,
W. R. LITZENBERG.